United States Patent [19]
Heckler et al.

[11] Patent Number: 4,949,470
[45] Date of Patent: Aug. 21, 1990

[54] GROOVE DEPTH LOCATION GAGE

[75] Inventors: Douglas J. Heckler; Richard S. Hille, Jr.; Tony L. Reynolds, all of Van Wert, Ohio

[73] Assignee: Aeroquip Corporation, Jackson, Mich.

[21] Appl. No.: 452,351

[22] Filed: Dec. 19, 1989

[51] Int. Cl.$^5$ .............................................. G01B 5/13
[52] U.S. Cl. ................................................. 33/836
[58] Field of Search ................. 33/836, 832, 833, 792, 33/802, 544, 501.05, 501.2, 501.4, 549, 501

[56] References Cited

U.S. PATENT DOCUMENTS 3,225,447 12/1965 Bryant ..................................... 33/792

FOREIGN PATENT DOCUMENTS 475353 2/1915 France ..................................... 33/836

Primary Examiner—Harry N. Haroian
Attorney, Agent, or Firm—Beaman & Beaman

[57] ABSTRACT

A gage for locating the relative axial distance between a groove defined in a bore and a bore radial shoulder, such as a blind end. An insert is received within the bore to be measured includes a groove indicator for location within the groove and a linear movable gage feeler is located adjacent the groove indicator whereby the relative distance between the groove indicator and the gage feeler upon the feeler engaging a bore shoulder can be determined. The groove indicator is mounted upon a radially movable finger for facilitating engagement with the bore groove.

6 Claims, 2 Drawing Sheets

GROOVE DEPTH LOCATION GAGE

BACKGROUND OF THE INVENTION.

Machining operations often require that bores be provided with grooves, shoulders, counterbores, and the like, and, of course, these bore configurations must be accurately axially located within the bore with respect to other bore dimensions. For instance, it is not uncommon for an annular groove to be defined at a predetermined axial location in a bore for receiving an annular sealing ring, and this bore must be accurately axially located with respect to other bore configurations such as a shoulder or blind end.

While gage devices have been used to measure the relative axially location of bore configurations, such measurement devices presently available are difficult to use, and measurements of this type are troublesome in that the position of the gage feeler, and the other gaging components, is not readily ascertainable in that the same are contained within the bore and not readily visible.

It is an object of the invention to provide a groove depth locater for a bore wherein the relative axial position of configurations within a bore may be readily and accurately ascertained.

An additional object of the invention is to provide a gage device for bores wherein axially spaced bore configurations may be accurately measured without requiring visual access by the operator.

Another object of the invention is to provide a gaging device for bores wherein radial bore configurations ma be physically sensed by the gaging apparatus and the position of the work piece being measured will be rigidly axially positioned during measurement.

In the practice of the invention a dial gage having a axially displaceable feeler is mounted upon a base in a manner adjustable in the direction of the feeler length. The work piece support is fixed relative to the gage and the gage feeler extends through the work piece support. The work piece support includes elongated fingers for supporting the work piece such that a bore defined therein is substantialy coaxially aligned with the feeler and the gage feeler is located within the bore. The work piece support includes a bore groove indicator which is received within the bore groove and the groove indicator is radially displaceable so as to be firmly received within the groove.

The gage feeler includes a bore shoulder sensor for engaging a radially shoulder, or the end of the bore, and upon the work piece support axially locating the work piece relative to the support in a predetermined axial location the engagement of the gage feeler shoulder sensor will permit the gage to indicate the relative axial dimension between the shoulder groove being engaged by the work piece support and the feeler shoulder sensor such that the dial on the gage will give a quick and accurate dimensional reading.

The work piece support groove indicator is defined upon a finger radially movable with respect to the longitudinal axis of the work piece support and the gage feeler, and the work piece support also includes a fixed work piece positioning member in the form of a finger to insure firm support of the work piece during measurement. As the groove indicator firmly engages the bore groove during measuring, and is held in the groove by a spring, axially positioning of the work piece is assured resulting in accurate measurement.

BRIEF DESCRIPTION OF THE DRAWINGS

The aformentioned objects and advantages of the invention will be appreciated from the following description and accompanying drawings wherein.

DESCRIPTION OF THE PREFERRED EMBODIMENT

Figure 1:
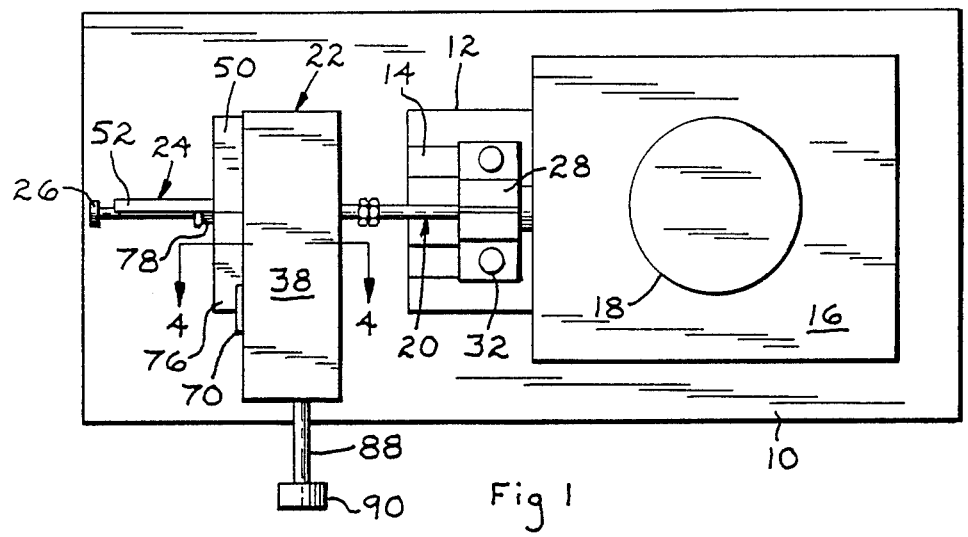
FIG. 1 is a plan view of a groove depth location gage in accord with the invention, the work piece to be measured not being illustrated.
Figure 2:
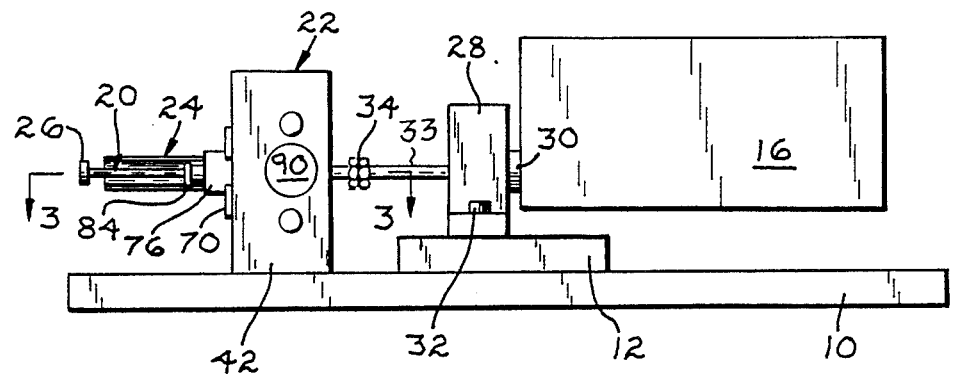
FIG. 2 is a side elevational view of the apparatus of FIG. 1.

With reference to FIGS. 1 and 2, the basic relationship of the components will be appreciated. A base plate 10 includes a base 12 fixed thereon having T-slots 14 formed therein, and a dial gage 16 is mounted upon the base 12 having a directly readable dial 18. The gage 16 may be of conventional construction for accurately indicating axial movement of the gage feeler 20 which is spring biased to the left. The work piece support, or insert support, 22 is fixed upon the base plate 10 and includes an insert generally indicated at 24 having a longitudinal axis, and the insert is of a tubular configuration and the gage feeler 20 coaxially extends therethrough. The work piece to be measured is mounted upon the insert, and as later described, the axial measurement is determined by comparing the position of a work piece with the position of the feeler head 26 formed on the end of the gage feeler upon the head engaging a shoulder in the work piece bore.

The gage 16 is mounted upon the base 12 by a split collar 28 encircling the gage neck 30. The collar is mounted upon the base by bolts 32 having heads slidably received within the T-slots 14 in the known manner, and by unloosening the bolts 32 the collar, neck and gage may be linearly positioned on the base 12 in the direction of the length of the T-slots. This type of mounting is well known in the machine arts.

The gage feeler 20 includes the extension stem 33 of the gage 16 having a contact pad 34, and at its end the feeler 20 is provided with the cylindrical head 26 having end surface 36 for engaging the bottom, or shoulders, within the bore to be measured, the head 26 constituting the shoulder sensor of the feeler.

Figure 3:
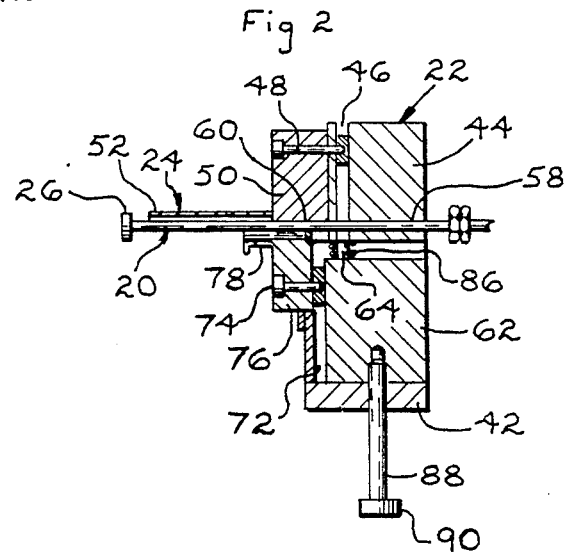
FIG. 3 is a plan sectional view taken along Section 3—3 of FIG. 2, the movable finger slide being shown in its normal condition.
Figure 4:
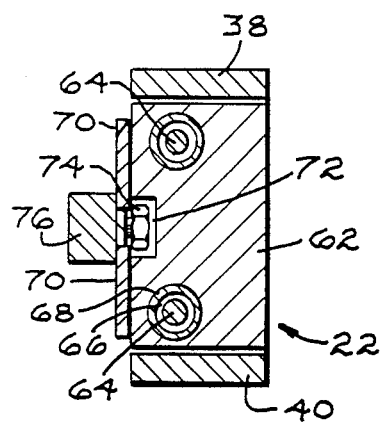
FIG. 4 is a elevational sectional view as taken along Section 4—4 of FIG. 1.
Figure 7:
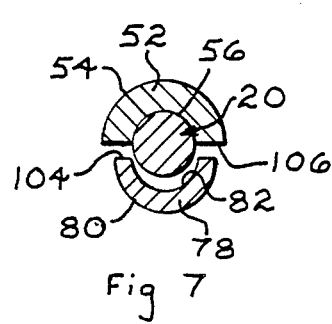
FIG. 7 is an elevational sectional view of the insert support fingers as taken along Section 7—7 of FIG. 5.

The insert support 22 is fixed upon the base plate 10 by fasteners, not shown, and the insert support includes upper and lower plates 38 and 40, respectively, FIG. 4, front plate 42 and block 44, all of which are fixed with respect to the base plate and each other. The block 44 includes a horizontally extending T-slot or dove-tail groove 46 receiving fasteners 48, FIG. 3, whereby the insert finger block 50 may be adjustably positioned upon the block. The block 50 supports an elongated "fixed" finger 52 which is of a transverse sectional configuration readily appreciated from FIG. 7 having an outer cylindrical surface 54, and an inner cylindrical surface 56 which corresponds to the diameter of the feeler 20.

As will be appreciated from FIG. 3, the feeler 20 slidably extends through the insert support 22 through opening 58 formed in the block 44 and the opening 60 defined in the finger block 50.

A slide block 62 is movably mounted within the insert support 22 between the plates 38 and 40, and is guided on the insert support by a pair of guide pins 64, FIG. 4, attached to the block 44. The guide pins 64 include sleeves 66 which are slidably received within bearing sleeves 68 defined in the block 62, FIG. 4, and in this manner the block 62 is slidably mounted upon the insert support 22 for movement in a radially direction with respect to the feeler 20 and the openings 58 and 60, and the bearing and pin sleeves ensure accurate radially movement of the slide block 62 while preventing movement in the axially direction of the feeler 20.

Figure 5:
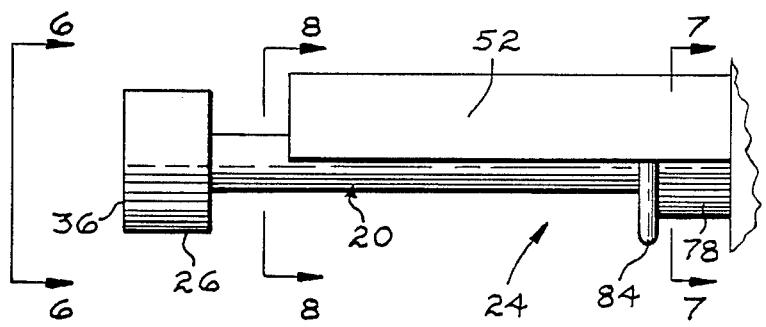
FIG. 5 is an enlarged, plan, detail view of the insert support fingers and gage feeler illustrating the fingers in their normal position.
Figure 6:
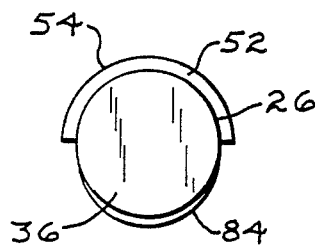
FIG. 6 is an elevational end view as taken along Section 6—6 of FIG. 5.
Figure 8:
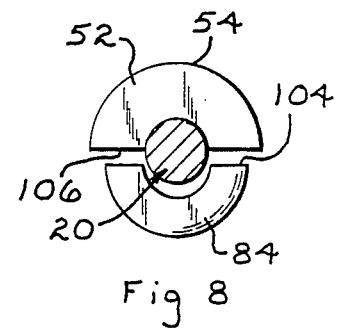
FIG. 8 is an elevational sectional view as taken along Section 8—8 of FIG. 5.

The movable block 62 includes plates 70 defining groove 72 receiving the fasteners 74 which adjustably locates the movable finger block 76 upon the slide block 62. By loosening, positioning and tightening of the fasteners 74 the finger block 76 may be radially positioned upon the slide block 62 as desired. The finger block 76 includes the axially extending radially movable finger 78 having a cross-sectional configuration which will be appreciated from FIG. 7 which includes the outer cylindrical surface 80 and the inner cylindrical surface 82, and the inner surface has a diameter substantially corresponding to the diameter of the feeler 20. At its end, the finger 78 includes a convex rib 84, having a configuration best appreciated from FIGS. 5 and 8, which is of an annular segment form having an outer diameter greater than the diameter 80 and substantially equal to the fixed finger diameter of surface 54, and the convex configuration of the rib is of a form corresponding to that of the groove in the work piece to be measured, as later described.

A pair of compression springs 86, FIG. 3, are located on the insert support interposed between the fixed block 44 and the radially movable slide block 62 and are located about the pins 64 and bias the slide block 62 away from the feeler 20. Further, an operating handle 88 is threaded into the slide block 62 extending through the insert support plate 42 having a knob 90 at its outer end whereby the slide block may be pushed toward the feeler 20 against the biasing action of the springs 86.

Figure 9:
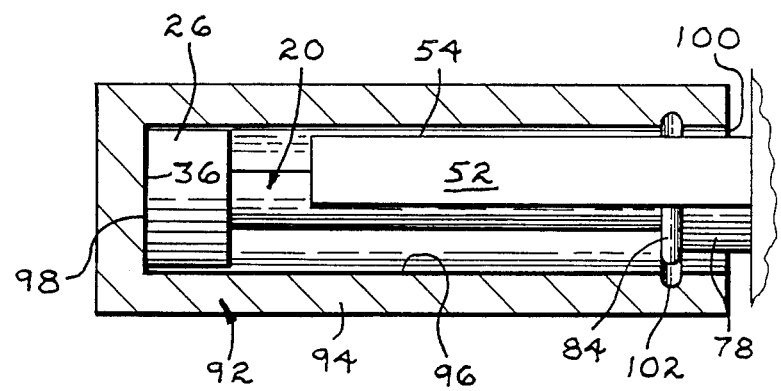
FIG. 9 is an enlarged, plan, detail dimetrical sectional view similar to FIG. 5 illustrating the master gage in position, and prior to radially displacing of the groove indicator into the bore groove.
Figure 10:
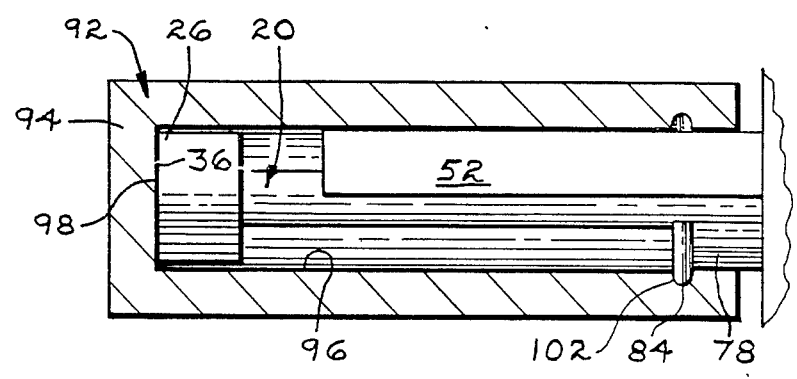
FIG. 10 is a plan, detailed, sectional view similar to FIG. 9, illustrating the groove indicator being fully received within the bore groove during measurement.

A master gage 92 is shown in FIGS. 9 and 10 which is used to calibrate the apparatus to measure a work piece and, the master gage includes a body 94 having a cylindrical bore 96 defined therein. The bore 96 includes a cylindrical wall and a blind end 98 perpendicular to the length of the wall. The bore also includes an open end 100 intersecting the body end and an annular groove 102 is formed in the bore between ends 98 and 100.

To calibrate the depth location apparatus of the invention the knob 90 is pressed inwardly sliding the block 62 toward the feeler 20 and compressing the springs 86. This movement of the slide block results in movement of the finger 78 toward the stationery finger 52 and movement of the finger 78 toward finger 52 continues until the substantially diametrical edges 104 of the movable finger 78 engage the diametrical edges 106 of the stationery finger 52. At such time the finger surface 82 will substantially engage the outer configuration of the feeler and the diametrical dimension of the insert fingers 52 and 78, combined, will be at a minimum. With the finger 78 contracted in this manner the master gage 92 is inserted over the feeler head 26, the feeler 20, and the insert fingers 52 and 78. The master gage is located upon the insert 24 such that the annular groove 102 will be radially aligned with the rib 84, as in FIG. 9, and this occurrence can be easily ascertained by manual feel by radially displacing the master gage relative to the insert fingers and thereby manually preliminary aligning the master gage upon the insert as shown in FIG. 9. Thereupon, the knob 90 is released permitting the finger 78 to be biased away from the feeler 20 and finger 52 by the springs 86 and this action will radially displace the finger 78 such that the rib 84 is fully received within the master gage groove 102 as illustrated in FIG. 10. It will be appreciated that when the insert finger 78 is "open" as in FIG. 10 the "opposite" portion of the bore 96 will engage the stationery finger surface 54, and also the bore 96 will engage the surface 80 of the movable finger 78. In this respect please compare with FIG. 9 wherein during the contracted condition of the insert fingers the insert finger surface 54 will be in a spaced relationship to the master gage bore.

Upon the rib 84 being received within the master gage bore groove 102 as in FIG. 10 the feeler head surface 36 will be engaging the bore end 98 due to the fact that the feeler 20 is spring biased to the left as is conventional with this type of dial gage. The gage dial 18 is now set to "0" by unloosening the fasteners 32 and positioning the collar 28 and gage 16 relative to the base 12 by sliding the fasteners 32 within the base T-slots 14 and then tightening bolts 32. The gage 16 is now set to permit work pieces having a bore to be measured which is dimensioned in accord with the master gage 92.

To gage the bore of work pieces, not shown, the work piece bore is placed over the feeler 20 and the contracted insert fingers 52 and 78 in a manner similar to that shown in FIG. 9. By feel, the work piece groove is radially aligned with the rib 84, and the knob 90 is then released so that the insert finger 78 is biased to the open condition of FIG. 10. This action will axially position the work piece to the insert support 22 at the "0" position and as the feeler head surface 36 will be engaging the end of the bore to be gaged, or a shoulder defined in the bore to be gaged, a direct reading of the gage dial 18 will quickly permit the axially relationship between the work piece surface being engaged by the feeler head 26 to be compared with the position of the bore groove in which the convex rib 84 is received.

The operational characteristics of the groove depth locater of the invention are such that work pieces may be quickly placed upon the insert 24 and the dial 18 rapidly indicates the axially dimensional relationships and tolerances between the work piece bore surfaces engaged by the rib 84 and the feeler head 26. The use of the apparatus eliminates many of the inaccuracies previously encountered with bore measurements, and the apparatus may be employed by operators of limited skills in view of the direct reading obtained by use of the gage dial.

It is appreciated that various modifications to the inventive concepts may be apparent to those skilled in the art without departing from the spirit and scope of the invention.

We claim:

1. A groove depth location gage for determining the relative axial distance between a groove and a shoulder defined in a bore having an axis comprising, in combination, a base, a gage mounted upon said base having a linearly displaceable feeler movable in an axial direction, shoulder sensing means defined on said feeler, a bore insert support mounted upon said base, a bore insert having an axis mounted upon said support, said feeler coaxially extending through said insert, and a groove indicator defined on said insert adapted to be received within the bore groove thereby permitting the axial spacing between the groove and bore shoulder to be indicated by said gage upon said feeler shoulder sensing means engaging the bore shoulder.

2. In a groove depth location gage as in claim 1, said insert including first and second elongated fingers, said first finger being radially fixed with respect to said insert axis, and means supporting said second finger on said insert support for radial movement relative to said insert axis.

3. In a groove depth location gage as in claim 2, said means supporting said second finger comprising a slide defined on said insert support radially movable with respect to said insert axis, said second finger being mounted upon said slide.

4. In a groove depth location gage as in claim 3, spring means mounted on said insert support biasing said slide away from said insert axis.

5. In a groove depth location gage as in claim 2, said first and second fingers each having an outer surface of a configuration complementary to the configuration of the bore.

6. In a groove depth location gage as in claim 5, said first and second fingers each having a transverse cross-sectional configuration of a segment of a cylindrical tube, said groove indicator comprising a convex rib defined on said second finger outer surface radially extending therefrom, said rib having a surface configuration complementary to the configuration of the groove being measured.

* * * * *

UNITED STATES PATENT OFFICE
CERTIFICATE OF CORRECTION

Patent No. 4,949,470          Dated August 21, 1990

Inventor(s) Douglas J. Heckler, Richard S. Hille, Jr. and Tony L. Reynolds

It is certified that error appears in the above-identified patent and that said Letters Patent is hereby corrected as shown below:

On the title page of the patent, the spelling of the name of the second inventor should read:

Richard S. Hile, Jr.

Signed and Sealed this

Twelfth Day of November, 1991

Attest:

HARRY F. MANBECK, JR.

*Attesting Officer*      *Commissioner of Patents and Trademarks*